US012670064B2

(12) United States Patent
Lacan et al.

(10) Patent No.: US 12,670,064 B2
(45) Date of Patent: Jun. 30, 2026

(54) MANAGING INTEGRATED CIRCUIT MEMORY CONTROLLER INTERRUPTS

(71) Applicant: STMicroelectronics International N.V., Geneva (CH)

(72) Inventors: Jerome Lacan, Trets (FR); Raphael Clauss, St Egreve (FR); Gerald Briat, Vif (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/010,970

(22) Filed: Jan. 6, 2025

(65) Prior Publication Data

US 2025/0231833 A1     Jul. 17, 2025

(30) Foreign Application Priority Data

Jan. 11, 2024     (FR) ........................................ 2400264

(51) Int. Cl.
G06F 11/10          (2006.01)
(52) U.S. Cl.
CPC ................................. G06F 11/1044 (2013.01)
(58) Field of Classification Search
CPC ............................. G06F 11/1044; G06F 11/08
USPC .............................. 714/6.21, 6.24, 48, 49, 54
See application file for complete search history.

(56) References Cited

U.S. PATENT DOCUMENTS

| | | | |
|---|---|---|---|
| 2008/0288809 A1 | 11/2008 | Koguchi et al. | |
| 2018/0314579 A1* | 11/2018 | Sampayo | ............ G06F 11/0721 |
| 2019/0272211 A1* | 9/2019 | Colombo | ............ G06F 11/0727 |
| 2021/0224155 A1 | 7/2021 | Bains et al. | |
| 2024/0427661 A1* | 12/2024 | Song | .................. G06F 11/1048 |

FOREIGN PATENT DOCUMENTS

| | | |
|---|---|---|
| EP | 2677429 A1 | 12/2013 |
| WO | WO 2023/091377 A1 | 5/2023 |

OTHER PUBLICATIONS

French Search Report for Application No. 2400264, dated Sep. 2, 2024, 20 pages.

* cited by examiner

*Primary Examiner* — Chae M Ko
(74) *Attorney, Agent, or Firm* — Alston & Bird LLP

(57)          ABSTRACT

The present disclosure provides an integrated circuit comprising a memory controller configured to transmit information stored in a memory to a processing unit. An example memory controller includes an error detection circuit configured to detect an error in the information by implementing an error correcting code algorithm, and to generate an interrupt signal in the event of detection of at least one error in the information and a transmission control circuit configured to transmit the interrupt signal to the processing unit only when the error is detected for the first time in the information by the error detection circuit.

16 Claims, 2 Drawing Sheets

[Fig. 1]
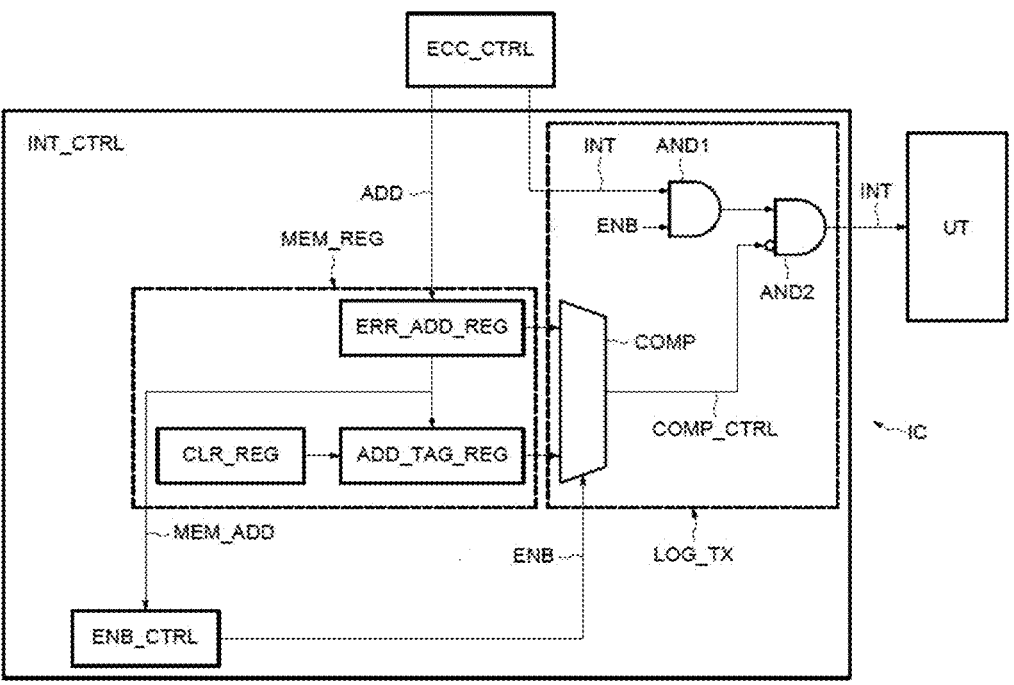
[Fig. 2]

[Fig. 3]
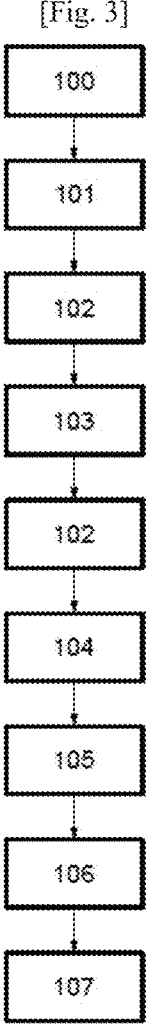

MANAGING INTEGRATED CIRCUIT MEMORY CONTROLLER INTERRUPTS

CROSS REFERENCE TO RELATED APPLICATION(S)

This application claims the priority benefit of French patent application number FR2400264, filed on Jan. 11, 2024, entitled "GESTION DES INTERRUPTIONS D'UN CONTRÔLEUR DE MÉMOIRE DE CIRCUIT INTÉGRÉ", which is hereby incorporated by reference to the maximum extent allowable by law.

TECHNICAL FIELD

Embodiments and implementations relate to an integrated circuit memory controller, and more particularly to the management of memory controller interrupts within an integrated circuit.

BACKGROUND

A memory controller makes it possible for a processor to access information, such as instructions or data, stored in a memory. The memory controller may particularly detect an error in information by implementing an error correcting code during the transmission of this information to the processor.

When an error in information is detected by the memory controller, the latter may generate an interrupt making it possible to indicate to the processor that the transmitted information contains an error.

However, it may be possible to correct the error in the information read by the memory controller instead of correcting this error directly in the memory. Indeed, correcting the error in the memory may require erasing and re-writing the information, which may be relatively long operations, particularly when the memory is a non-volatile memory. The error correction performed by the memory controller is therefore generally faster and preferred, in particular in the case of real-time applications.

Moreover, when the memory stores a plurality of instructions of a sequence of instructions, the processor may provide a pre-loading mechanism making it possible to read in this memory each of these instructions in advance at the same time as executing other instructions of the sequence of instructions in order to improve the performance of the processor.

More particularly, this pre-loading mechanism may trigger an interrupt when the instruction read in advance contains an error, thus temporarily stopping the execution of the sequence of instructions.

As long as the instruction is not executed before the interrupt of the sequence of instructions, the processor will continue to read the same instruction after having processed the interrupt.

Consequently, the pre-loading mechanism generates a repeated triggering of the interrupt as long as the error contained in this instruction has not been corrected in the memory.

In other terms, the repeated triggering of the interrupt prevents the processor from continuing the execution of the sequence of instructions because the processor will always attempt to access at the same location in the memory the erroneous instruction after each interrupt.

In this regard, deactivating the interrupts may be possible in order to prevent the repeated triggering of the interrupt for the same error contained in an instruction, but this solution does not make it possible to determine the location in the memory of the erroneous instruction. Consequently, when this solution is possible, the erroneous instructions of which the location in the memory cannot be found by the processing unit, will not be able to be corrected.

Thus, there is a need to propose solutions making it possible to detect and correct an error in information while preventing repeated access to the same location in the memory by the processor during interrupts generated by the memory controller.

BRIEF SUMMARY

According to one aspect, an integrated circuit is proposed comprising a memory controller configured to transmit information, an instruction or data for example, stored in a memory to a processing unit, such as a processor for example, the memory controller comprising:

an error detection circuit configured to detect an error, or optionally a plurality of errors, in the information by implementing an error correcting code algorithm, and to generate an interrupt signal in the event of detection of an error in the information, a transmission control circuit configured to transmit the interrupt signal to the processing unit only when the error is detected for the first time in the information by the error detection circuit.

By transmitting the interrupt signal to the processing unit only the first time the error is detected, this prevents the repeated triggering of the interrupt signal that leads the processing unit to re-enter an infinite loop wherein this same interrupt signal is processed by the processing unit.

Thus, in the absence of repeated triggering of the interrupt signal, it is no longer necessary to deactivate the interrupts to end this infinite loop and it becomes possible to correct the errors in the instructions stored in the memory during a maintenance operation.

According to one embodiment, the transmission control circuit includes a memory circuit configured to store the address of the location in the memory of the last information having triggered a transmission of the interrupt signal, and a logic circuit configured to compare the address stored by the memory circuit with the address of the location in the memory of the next information, for which an error is detected, transmitted by the memory controller after the last information so as to transmit the interrupt signal to the processing unit only when the address of the location in the memory of the next information does not correspond to the address stored by the memory circuit.

"Next information" information or data stored in the memory that is transmitted to the processing unit after the last information in the order of transmission of information, which may for example be the same order as that of the sequence of instructions executed by the processing unit.

The next information and the last information may be the same information stored in a location of the memory, for example if the same instruction is transmitted twice in a row to the processing unit, or two items of information stored in two different locations of the memory.

The memory circuit is configured to store one address at a time so that the logic circuit can compare the address of the location in the memory of the next information with only one stored address which is that of the last information.

The address of the location in the memory of the last information having triggered a transmission of the interrupt signal is stored to prevent each new interrupt generated during the detection of an error in this information from being transmitted to the processing unit.

Advantageously, the transmission control circuit has a logic circuit making it possible to transmit the interrupt if the address of the next information is different from the stored address or to block the interrupt if the address of the next information and the stored address correspond.

According to one embodiment, the memory circuit includes:—a first register configured to store the address of the location in the memory of the information in the event of detection of an error in the information by the error detection circuit, a second register configured to store the address contained in the first register before an error is detected in the next information.

Such a memory circuit may therefore be produced easily from two registers for example.

The logic circuit includes a comparison circuit configured to generate a control signal having a value corresponding to the result of the comparison between the address contained in the first register and the address contained in the second register, and a conditional transmission circuit configured to transmit the interrupt signal only when the address stored in the first register does not correspond to the address stored in the second register.

The conditional transmission circuit, for example an "AND" logic gate, makes it possible to filter, according to the comparison result of the comparison circuit, the interrupts generated by the error detection circuit in order to only transmit the interrupt generated when the error is detected for the first time in the information.

According to one embodiment, the processing unit is configured to control the logic circuit such that the logic circuit compares the stored address with the address of the location in the memory of the next information as soon as the address of the last information is stored by the memory circuit.

Thus, a new transmission of the interrupt signal by the logic circuit is prevented when the address of the last information has not yet been stored by the memory circuit. For example, the same stored address that is compared more than once before being updated risks triggering a transmission of a plurality of interrupt signals generated for the same error, for example for an error in the same information transmitted several times before the stored address is updated.

According to one embodiment, the memory controller includes an additional conditional transmission circuit configured to block the transmission of the interrupt signal by the transmission control circuit as long as the address of the last information is not stored by the memory circuit.

The additional conditional transmission circuit may particularly be considered when the conditional transmission circuit is no longer able to ensure the blocking of certain interrupts.

According to one embodiment, the processing unit is configured, during the reception of the interrupt signal, to read the address contained in the second register and to store in an additional memory the address read.

The additional memory therefore makes it possible to store a single address for each information for which an error has been detected during the execution of the sequence of instructions by the processing unit.

According to one embodiment, the integrated circuit further includes a correction circuit, which may for example be the processing unit, configured to correct the information stored in the memory at the corresponding addresses stored in the additional memory.

These addresses, once stored in the additional memory, make it possible to find all erroneous information directly in the memory and to correct it during a maintenance operation, and thus makes it possible to prevent a correction of this information during each interrupt.

According to one embodiment, the processing unit is configured to erase the content of the second register after the correction of the information stored in the memory by the processing unit.

Thus, the content of the second register can be erased after the maintenance operation, for example during a restart of the integrated circuit. This makes it possible to prevent the address of information already corrected during the maintenance operation from remaining stored in the second register after the maintenance operation.

According to another aspect, a method is proposed for transmitting at least one information stored in a memory to a processing unit, comprising:

detecting an error in the information by implementing an error correcting code algorithm and, in the event of detection of an error in the information, generating an interrupt signal, —transmitting the interrupt signal only when the error is detected for the first time in the information by the error detection circuit.

According to one implementation, the method comprises storing the address of the location in the memory of the last information having triggered a transmission of the interrupt signal and comparing the stored address with the address of the location in the memory of each information, for which an error is detected, transmitted after the last information so as to transmit the interrupt signal to the processing unit only when the address of the location in the memory of the information does not correspond to the address stored by the memory circuit.

According to one implementation, the storage comprises:

storing in a first register the address of the location in the memory of the information in the event of detection of an error in the information, storing in a second register the address contained in the first register before an error is detected in the next information.

The comparison comprises generating a control signal having a value corresponding to the result of the comparison between the address contained in the first register and the address contained in the second register, and transmitting the interrupt signal only when the address stored in the first register does not correspond to the address stored in the second register.

According to one implementation, the comparison of the stored address with the address of the location in the memory of the next information is performed as soon as the address of the last information is stored.

According to one implementation, the method comprises blocking the transmission of the interrupt signal as long as the address of the last information is not stored.

According to one implementation, the method comprises, during the reception of the interrupt signal by the processing unit, reading the address stored in the second register by the processing unit and storing in an additional memory the address read by the processing unit.

According to one implementation, comprising erasing the content of the second register after the correction of the information stored in the memory by the processing unit.

BRIEF DESCRIPTION OF THE DRAWINGS

Other advantages and features of the present disclosure will become apparent upon examining the detailed description of non-limiting embodiments and implementations, and from the accompanying drawings, wherein:

FIG. 1, FIG. 2, and FIG. 3 schematically illustrate implementations and embodiments of the present disclosure.

DETAILED DESCRIPTION

FIG. 1 schematically illustrates an integrated circuit IC according to one embodiment of the present disclosure. The integrated circuit IC comprises a memory ECC_MEM, such as a non-volatile memory, and an additional memory MEM, such as a random access memory (RAM) for example.

The integrated circuit IC also comprises a memory controller MEM_CTRL and a processing unit UT, such as a processor for example.

The memory ECC_MEM typically makes it possible to store information such as an instruction or data, as well as an error correcting code (ECC).

The memory controller MEM_CTRL is configured to transmit the information stored in the memory ECC_MEM to the processing unit UT.

The information stored in the memory ECC_MEM, for example the instruction MEM_DAT of a sequence of instructions executed by the processing unit UT or data, may contain errors.

In this regard, the memory controller MEM_CTRL comprises an error detection circuit ECC_CTRL configured to detect an error or a plurality of errors in the information by implementing an error correcting code algorithm, and to generate an interrupt signal INT in the event of detection of an error in the information MEM_DAT.

Such an error detection circuit ECC_CTRL is well known to the person skilled in the art who will know how to determine an error correcting code making it possible to detect the presence of an error in an instruction or data depending on the error correcting code contained in the memory MEM_ECC. These error correcting code algorithms may be algorithms based on the Hamming code or the Golay code, although these examples of algorithms are not exhaustive.

The error detection circuit ECC_CTRL makes it possible, for example, to read the instruction MEM_DAT in the memory ECC_MEM and to correct this instruction MEM_DAT before transmitting it to the processing unit UT.

The error detection circuit ECC_CTRL is configured to generate an interrupt signal INT during a detection of an error in the information.

The interrupt signal INT may be generated in the form of a pulse corresponding to a "high" logic level for a given duration when an error is detected by the error detection circuit ECC_CTRL.

The interrupt signal INT temporarily interrupts the execution of the sequence of instructions by the processing unit UT in order to make it possible for the processing unit UT to react in the event of detection of an error in the information MEM_DAT.

The memory controller MEM_CTRL also comprises a transmission control circuit INT_CTRL. The transmission control circuit INT_CTRL is configured to transmit the interrupt signal INT only when the error is detected for the first time in the information by the error detection circuit ECC_CTRL.

For example, when the error detection circuit ECC_CTRL detects for the first time an error in the information MEM_DAT, the transmission control circuit INT_CTRL transmits the interrupt signal INT to the processing unit UT but prevents the transmission of interrupt signals that might be generated subsequently in the event of detection of errors in the same information MEM_DAT.

The transmission control circuit INT_CTRL thus makes it possible to prevent an interrupt from being transmitted to the processing unit UT when an error is detected again by the error detection circuit ECC_CTRL for the same information.

By transmitting the interrupt signal INT to the processing unit UT only the first time the error is detected, this prevents the repeated triggering of the interrupt signal that leads the processing unit to re-enter an infinite loop wherein this same interrupt signal is processed by the processing unit.

Consequently, the processing unit UT, which has for example the pre-loading mechanism described above, may continue the execution of the sequence of instructions without being subjected to repeated triggering of an interrupt.

FIG. 2 schematically illustrates an example of transmission control circuit INT_CTRL of the memory controller MEM_CTRL such as described above in relation to FIG. 1.

The transmission control circuit INT_CTRL includes a memory circuit MEM_REG and a logic circuit LOG_TX.

The memory circuit MEM_REG is configured to store the address of the location in the memory ECC_MEM of the last information having triggered a transmission of the interrupt signal INT.

The memory circuit MEM_REG comprises hardware elements making it possible to read the address ADD of the information for which an error has been detected, for example by means of the error detection circuit ECC_CTRL and store this address ADD.

The logic circuit LOG_TX is configured to compare the address stored by the memory circuit MEM_REG with the address of the location in the memory ECC_MEM of the next information, for which an error is detected, transmitted after the last information.

During the comparison by the logic circuit LOG_TX, if the address of the location in the memory ECC_MEM of the next information does not correspond to the address stored by the memory circuit MEM_REG, then the interrupt signal INT is transmitted to the processing unit UT.

In other terms, the logic circuit LOG_TX uses the address stored by the memory circuit as comparison base with each address transmitted by the error detection circuit ECC_CTRL in the event of detection of an error in the information, so as to prevent the interrupt signal INT from being transmitted once again for an error detected in the same information.

The transmission control circuit INT_CTRL further includes a control register ENB_CTRL. The processing unit UT is configured to control the logic circuit LOG_TX depending on the value stored in the control register ENB_CTRL.

More particularly, the processing unit UT is configured to modify the value of the control register ENB_CTRL when the address of the last information having triggered the interrupt signal INT is stored by the memory circuit MEM_REG. The processing unit UT generates an activation signal ENB from the value stored in the control register ENB_CTRL, so as to make it possible for the logic circuit LOG_TX to perform the comparison as soon as the address of the last information is stored by the memory circuit MEM_REG.

The memory circuit MEM_REG includes a first register ERR_ADD_REG and a second register ADD_TAG_REG.

The first register ERR_ADD_REG is configured to store the address ADD of the location in the memory ECC_MEM of the information in the event of detection of an error in the information by the error detection circuit ECC_CTRL. Each new address transmitted by the error detection circuit ECC_CTRL can be automatically stored in the first register ERR_ADD_REG in the event of detection of an error in the information, for example by replacing the address contained in the first register ERR_ADD_REG by the new address.

The second register ADD_TAG_REG is configured to store the address contained in the first register ERR_ADD_REG before an error is detected in the next information.

For example, the storage of the address in the second register ADD_TAG_REG can be carried out by the processing unit UT in response to the interrupt signal INT.

During the initialisation of the integrated circuit IC, the second register ADD_TAG_REG stores an initialisation value that may be different from the values of the addresses of the memory ECC_MEM.

The logic circuit LOG_TX includes a comparison circuit COMP configured to generate a control signal COMP_CTRL having a value corresponding to the result of the comparison between the address contained in the first register ERR_ADD_REG and the address contained in the second register ADD_TAG_REG.

The comparison circuit COMP may be a digital comparator of conventional design making it possible to perform a bit-to-bit comparison between the address stored in the first register ERR_ADD_REG and the address stored in the second register ADD_TAG_REG.

The control signal COMP_CTRL generated by such a comparator COMP may be a signal the voltage value of which corresponds to a different logic level according to the result of the comparison. For example, the control signal COMP_CTRL may have a "high" logic level if the addresses respectively stored in the first register ERR_ADD_REG and the second register ADD_TAG_REG are identical and a "low" logic level if these addresses are different.

The logic circuit LOG_TX also includes a conditional transmission circuit AND2 configured to transmit the interrupt signal INT only when the address stored in the first register ERR_ADD_REG does not correspond to the address stored in the second register ADD_TAG_REG.

The conditional transmission circuit may be a logic gate configured to perform the "AND" logic operation between the interrupt signal INT and the control signal COMP_CTRL. In particular, an inverter may be connected to an input of the logic gate AND2 so as to transmit the inverse logic level of the control signal COMP_CTRL to the logic gate AND2.

The interrupt signal INT is then retransmitted as output of the logic gate AND2 according to the logic level of the control signal COMP_CTRL. More particularly, if the inverse logic level of the control signal COMP_CTRL as input of the logic gate AND2 is the "high" level, for example when the address ADD of the information MEM_DAT is different from the stored address, then the interrupt signal INT is transmitted to the processing unit UT. In the opposite case, that is to say if the inverse logic level of the control signal COMP_CTRL as input of the logic gate AND2 is the "low" level, then the interrupt signal INT is not transmitted to the processing unit UT.

The memory controller MEM_CTRL includes an additional conditional transmission circuit AND1 configured to block the transmission of the interrupt signal INT by the transmission control circuit INT_CTRL as long as the address of the last information is not stored by the memory circuit MEM_REG.

The additional conditional transmission circuit AND1 may be a logic gate configured to perform the "AND" logic operation between the interrupt signal INT and the activation signal ENB.

Upon receipt of the interrupt INT, signal the processing unit UT can read the address stored in the second register ADD_TAG_REG and store this address in an additional memory MEM.

The additional memory MEM makes it possible to store the address of each information for which an error has been detected during the execution of the sequence of instructions by the processing unit UT. These addresses, once stored in the additional memory, may be used to perform a maintenance operation during which each erroneous information that is stored in the memory ECC_MEM is corrected.

In this regard, the integrated circuit further includes a correction circuit, which may be for example the processing unit UT, configured to correct the information stored in the memory at the corresponding addresses stored in the additional memory.

During the maintenance operation, the processing unit UT can find all of the erroneous information stored in the memory ECC_MEM from the addresses stored in the additional memory MEM and correct this information. Such a maintenance operation may particularly take place after the end of the execution of the sequence of instructions by the processing unit UT, so as to prevent this information from being corrected during each interrupt for example.

The integrated circuit IC can then restart after the maintenance operation. However, the address of the last information having triggered the interrupt signal INT is also stored in the second register ADD_TAG_REG after the restart of the integrated circuit IC when this information was corrected during the maintenance operation. The interrupt signal INT that would be generated by the error detection circuit ECC_CTRL during the detection of a new error in this information risks not being transmitted to the processing unit UT if the address of this information is also stored in the second register ADD_TAG_REG.

To prevent this risk, the processing unit UT is configured to erase the content of the second register ADD_TAG_REG after the correction of the information stored in the memory ECC_MEM by the processing unit UT.

In particular, the transmission control circuit INT_CTRL includes an erasure register CLR_REG configured to store a value defined by the user.

For example, an initialisation value can be stored in the erasure register CLR_REG during the first use of the integrated circuit IC such that, during each restart of the integrated circuit IC, the processing unit UT reads the initialisation value stored in the erasure register CLR_REG and replaces the value stored in the second register ADD_TAG_REG by this initialisation value.

FIG. 3 schematically illustrates a method for transmitting at least one information stored in the memory ECC_MEM to the processing unit UT.

The method comprises a step 100 of detecting an error in the information by implementing an error correcting code algorithm and, in the event of detection of an error, or a plurality of errors, in the information, generating an interrupt signal INT.

The method comprises a step 101 of transmitting the interrupt signal INT, for example by the transmission control circuit INT_CTRL such as described above in relation to FIGS. 1 and 2, only when the error is detected for the first time in the information by the error detection circuit.

The method also comprises a step 102 of storing the address of the location in the memory ECC_MEM of the last information having triggered a transmission of the interrupt signal INT.

Step 102 comprises storing in a first register ERR_AD-D_REG the address of the location in the memory ECC_MEM of the information in the event of detection of an error in the information.

Step 102 also comprises storing in a second register ADD_TAG_REG the address contained in the first register ERR_ADD_REG before an error is detected in the next information. An initialisation value, which may be different from the values of the addresses of the memory ECC_MEM, may be stored in the second register ADD_TAG_REG by default if none of the addresses of the memory ECC_MEM was stored, for example during the initialisation of the integrated circuit IC.

The method comprises a step 103 of comparing, for example by a logic circuit LOG_TX, the stored address with the address of the location in the memory ECC_MEM of the next information, for which an error is detected, transmitted after the last information. If, after this comparison, the address of the location in the memory ECC_MEM of the next information does not correspond to the address stored by the memory circuit MEM_REG, then the interrupt signal INT is transmitted to the processing unit UT.

Step comprises detecting the storage of the 103 address of the last information having triggered a transmission of the interrupt signal INT and generating an activation signal ENB from the value stored in the control register ENB_C-TRL so as to make it possible for the logic circuit LOG_TX to perform the comparison as soon as the address of the last information is stored by the memory circuit MEM_REG.

Step 103 comprises generating a control signal COM-P_CTRL. The control signal COMP_CTRL has a value corresponding to the result of the comparison between the address contained in the first register ERR_ADD_REG and the address contained in the second register ADD_TAG_REG.

Step 103 also comprises transmitting the interrupt signal INT only when the address stored in the first register ERR_ADD_REG does not correspond to the address stored in the second register ADD_TAG_REG.

The method comprises a step 104 of blocking the transmission of the interrupt signal INT by the transmission control circuit INT_CTRL as long as the address of the last information is not stored.

The method comprises a step 105 of receiving the interrupt signal INT by the processing unit UT.

Step 105 comprises reading the address stored in the second register ADD_TAG_REG by the processing unit UT and storing in an additional memory MEM the address read by the processing unit UT.

The method further comprises a step 106 of correcting the information stored in the memory ECC_MEM at the corresponding addresses stored in the additional memory. The correction of step 107 may for example be carried out by the processing unit UT.

The method comprises a step 107 of erasing the content of the second register ADD_TAG_REG after the correction of the information stored in the memory ECC_MEM by the processing unit UT. Such an erasure may comprise for example reading an initialisation value stored in the erasure register CLR_REG and replacing the address stored in the second register ADD_TAG_REG by this initialisation value.

The invention claimed is:

1. An integrated circuit comprising a memory controller configured to transmit information stored in a memory to a processing unit, the memory controller comprising:
   an error detection circuit configured to detect an error in the information by implementing an error correcting code algorithm and to generate an interrupt signal in an event of detection of an error in the information; and
   a transmission control circuit configured to transmit the interrupt signal to the processing unit only when the error is detected for a first time in the information by the error detection circuit.

2. The integrated circuit of claim 1, wherein the transmission control circuit includes a memory circuit configured to store an address of a location in the memory of a last information having triggered a transmission of the interrupt signal, and a logic circuit configured to compare the address stored by the memory circuit with the address of the location in the memory of a next information, for which an error is detected, transmitted after the last information so as to transmit the interrupt signal to the processing unit only when the address of the location in the memory of the next information does not correspond to the address stored by the memory circuit.

3. The integrated circuit of claim 2, wherein the memory circuit includes:
   a first register configured to store the address of the location in the memory of the information in the event of detection of an error in the information by the error detection circuit;
   a second register configured to store the address contained in the first register before an error is detected in the next information; and
   wherein the logic circuit includes a comparison circuit configured to generate a control signal having a value corresponding to a result of a comparison between the address contained in the first register and the address contained in the second register, and a conditional transmission circuit configured to transmit the interrupt signal only when the address stored in the first register does not correspond to the address stored in the second register.

4. The integrated circuit of claim 2, wherein the processing unit is configured to control the logic circuit such that the logic circuit compares the address stored with the address of the location in the memory of the next information as soon as the address of the last information is stored by the memory circuit.

5. The integrated circuit of claim 2, wherein the memory controller includes an additional conditional transmission circuit configured to block the transmission of the interrupt signal by the transmission control circuit as long as the address of the last information is not stored by the memory circuit.

6. The integrated circuit of claim 3, wherein the processing unit is further configured, during a reception of the interrupt signal, to read the address stored in the second register and to store in an additional memory the address read by the processing unit.

7. The integrated circuit of claim 6 further comprising a correction circuit configured to correct the information stored in the memory at a corresponding addresses stored in the additional memory.

8. The integrated circuit of claim 7, wherein the processing unit is further configured to erase a content of the second register after a correction of the information stored in the memory.

9. A method for transmitting information stored in a memory to a processing unit comprising:

detecting an error in the information by implementing an error correcting code algorithm;

generating, in an event of detection of an error in the information, an interrupt signal; and transmitting the interrupt signal to the processing unit only when the error is detected for a first time in the information by an error detection circuit.

10. The method of claim 9 further comprising:

storing an address of a location in the memory of a last information having triggered a transmission of the interrupt signal and comparing the address stored with the address of the location in the memory of a next information, for which an error is detected, transmitted after the last information so as to transmit the interrupt signal to the processing unit only when the address of the location in the memory of the next information does not correspond to the address stored.

11. The method of claim 10, wherein storing the address comprises:

storing in a first register the address of the location in the memory of the information in the event of detection of an error in the information;

storing in a second register the address contained in the first register before an error is detected in the next information; and

wherein the comparison comprising generating a control signal having a value corresponding to a result of the comparison between the address contained in the first register and the address contained in the second register, and transmitting the interrupt signal only when the address stored in the first register does not correspond to the address stored in the second register.

12. The method of claim 10, wherein the comparison of the address stored with the address of the location in the memory of the next information is performed as soon as the address of the last information is stored.

13. The method of claim 10 further comprising blocking the transmission of the interrupt signal as long as the address of the last information is not stored.

14. The method of claim 10 further comprising, during a reception of the interrupt signal by the processing unit, reading the address stored in a second register by the processing unit and storing in an additional memory the address read by the processing unit.

15. The method of claim 14 further comprising correcting the information stored in the memory at corresponding addresses stored in the additional memory.

16. The method of claim 15 further comprising erasing a content of the second register after a correction of the information stored in the memory by the processing unit.

* * * * *